United States Patent
Canbekte

(10) Patent No.: US 9,540,708 B2
(45) Date of Patent: Jan. 10, 2017

(54) IRON RECOVERY METHOD

(71) Applicant: Husnu Sinan Canbekte, Istanbul (TR)

(72) Inventor: Zekeriya Canbekte, Istanbul (TR)

(73) Assignee: Hüsnü Sinan Canbekte, Istanbul (TR)

(*) Notice: Subject to any disclaimer, the term of this patent is extended or adjusted under 35 U.S.C. 154(b) by 0 days.

(21) Appl. No.: 14/425,922

(22) PCT Filed: Sep. 3, 2013

(86) PCT No.: PCT/EP2013/068159
§ 371 (c)(1),
(2) Date: Mar. 4, 2015

(87) PCT Pub. No.: WO2014/037335
PCT Pub. Date: Mar. 13, 2014

(65) Prior Publication Data
US 2015/0225810 A1    Aug. 13, 2015

(30) Foreign Application Priority Data

Sep. 4, 2012 (EP) .................................... 12182923

(51) Int. Cl.
C22B 3/44    (2006.01)
C22B 3/00    (2006.01)
C01G 49/06   (2006.01)

(52) U.S. Cl.
CPC .............. *C22B 3/44* (2013.01); *C01G 49/06* (2013.01); *C22B 23/043* (2013.01); *C22B 23/0461* (2013.01)

(58) Field of Classification Search
None
See application file for complete search history.

(56) References Cited

U.S. PATENT DOCUMENTS

| 4,435,369 | A | * | 3/1984 | Simpson | 423/147 |
| 4,618,375 | A | * | 10/1986 | Patil et al. | 106/404 |
| 7,294,319 | B2 | | 11/2007 | Lahtinen et al. | |
| 2010/0296988 | A1 | * | 11/2010 | Roche et al. | 423/49 |

FOREIGN PATENT DOCUMENTS

WO    2007079532    7/2007

OTHER PUBLICATIONS

Subrt, et al., "Uniform Particles with a Large Surface Area Formed by Hydrolysis of Fe2(SO4)3 with Urea", Materials Research Bulletin, Elsevier, Kidlington, GB, vol. 34, No. 6, Apr. 1, 1999, pp. 905-914, XP004362446, ISSN: 0025-5408.

* cited by examiner

*Primary Examiner* — Melissa Swain
(74) *Attorney, Agent, or Firm* — Volpe and Koenig, P.C.

(57) ABSTRACT

A method for recovery of iron in the form of an iron oxide as useful product, such as hematite, from a leach solution obtained from leaching of a nickel laterite ore, is proposed which comprises an oxidation and a hydrolysis of a ferric sulphate and urea mix solution stemming from leaching of nickel laterite ores at a temperature of 60-100° C.

8 Claims, No Drawings

IRON RECOVERY METHOD

TECHNICAL FIELD OF THE INVENTION

The present invention relates to a process for the precipitation of iron as hematite from a solution of Fe2(SO4)3/urea mixture containing nickel and cobalt sulphates.

BACKGROUND

Leaching of nickel laterite ores with sulphuric acid is a widely applied process. Some recent researches indicate that when urea is added to the leach solution in sufficient amounts, metal dissolution rates and metal recoveries into the solution markedly increase. As such, the leaching time drops to one hour and metal recoveries rise above 95%.

These improvements are due to the effect of urea on the dissolution of iron contained in the metal bearing material. When iron is attacked and forced into dissolution, other metals that are bound with iron in some kind of iron bond become easy targets for sulphuric acid and thus their dissolution rate increases markedly.

Iron removal from the leach solution is important for the recovery of other metals and for process economics. Iron is normally removed from the solution as jarosite, goethite or hematite but none of them result in a usable iron product. Jarosite and goethite produced as such are discarded as waste with no economic value. For hematite production, iron precipitation should be carried out in an autoclave at temperatures of over 200° C. and oxygen pressure of 18 bars or above. Iron can also be precipitated out of the solution as hydroxide produced by precipitation with lime to be discarded as waste.

A great deal of research has been conducted in respect of iron precipitation as hematite that can be used in industry. U.S. Pat. No. 7,294,319 describes a method for precipitating iron from zinc sulphate solution as hematite under atmospheric conditions. Similarly, WO 2007/079532 describes a hydrometallurgical method for precipitating iron in the form of hematite from leach solutions containing nickel, cobalt and iron.

The Article 'Uniform Particles with a large surface area formed by hydrolysis of Fe2(SO4)3 with Urea' published in 1999 in Materials Research Bulletin Vol 34 No 6 pp 905-919 describes hydrolysis of iron oxide from a solution of Fe2(SO4)3/Urea mixture under various conditions. The article indicates that slow hydrolysis of aqueous solutions of Fe2(SO4)3 with Urea in the temperature range 60-100° C. leads to a characteristic form of iron (III) hydrous oxides and basic sulfates. Thermal dehydration of this iron (III) hydrous oxides yields amorphous Fe2O3.

SUMMARY

The object of the invention is to provide a method for efficient recovery of iron as a usable iron oxide product, such as hematite, without losing urea from a Fe2(SO4)3/urea mix solution containing nickel and cobalt sulphates resulting from leaching of nickel laterite ores with a mixture of sulphuric acid and urea.

This object is achieved by means of a method comprising the features of the invention. Preferred further embodiments of the method are defined below and in the claims.

During the work leading to the present invention it was found possible to recover iron under atmospheric conditions from a Fe2(SO4)3/urea solution containing nickel and cobalt sulphates.

Nickel and cobalt may be recovered from the solution prior to iron recovery by resins or by any other available method after iron recovery.

An advantage with the method according to the invention is that the method can—in preferred embodiments thereof—be performed at atmospheric pressure and at temperatures from 60° C. to 100° C., that no gases are emitted and that, due to short residence time, simple and inexpensive equipment can be used to perform the method. Furthermore, iron can be recovered as a usable product and an important part of the acid and nearly all of the urea can be recycled to be used in the leaching of fresh nickel laterite ores or nickel bearing materials, which results in reduced acid consumption in the leaching.

Thus, the present invention relates to a process involving recovery of dissolved iron as iron oxide and recycling of the leach mixture.

Advantageously, sulphuric acid associated with iron dissolution is recovered substantially without loss.

Furthermore, urea which is important in reducing the leaching time of nickel bearing materials and for increasing the leaching recoveries of nickel and cobalt is recovered virtually without any loss.

Additional features of the method according to the invention will be evident from the following description and the appended claims.

DETAILED DESCRIPTION OF THE INVENTION

The term 'metal' used herein and in the appended claims may encompass nickel, cobalt and any other metals that are normally soluble in sulphuric acid.

Not all of steps a) through i) as detailed below must be realized in a method according to the invention but may be combined freely in a particular embodiment thereof.

a) For the recovery of iron as hematite or usable iron oxide, the pH of the leach solution from leaching of nickel bearing material is adjusted to a pH of 2.5-3.0 by treating the solution with nickel laterite ore or nickel bearing material. No lime or limestone is used for pH adjustment in order to prevent loss of sulphuric acid through formation of gypsum.

b) Following solid liquid separation, the residue obtained after pH adjustment is sent to a separate leach system, while the solution with pH 2.5-3.0 is stirred at a temperature of around 90° C. Celsius.

c) Nickel and cobalt dissolved in the leach solution may be recovered prior to iron recovery by resins or, alternatively, they may be recovered after iron recovery by any known method such as solvent extraction and/or electrolysis.

d) While stirring the solution, an oxidizing agent such as hydrogen peroxide and/or oxygen/air is added.

e) Addition of ferrous sulphate in a stochiometric amount helps with conversion of goethite to hematite.

f) After about 20-30 minutes of stirring, hematite particles are added as seed particles. When the stirring is stopped, flocs of iron oxide particles start to form and settle fast.

g) The slurry is then filtered easily to separate iron oxides from the solution.

h) The solution, which is now free of iron but contains nickel and/or cobalt, if those have not been recovered previously, will have a pH of around 1.0-1.5 which, if nickel and cobalt concentrations are not high enough, can be sent to a leaching system.

i) If nickel and cobalt concentration of the solution is high enough, said solution can be treated further to recover metals. If any pH adjustment of the solution is required for this purpose, this can be achieved by treating the solution with nickel bearing material. Any residue from this pH adjustment leach will be sent to a leaching system.

Practically, the method is advantageously performed in vessels made from stainless steels or mild steel or concrete tanks which can be lined with proper protective lining.

The invention will now be further explained in the following example. This example is only intended to illustrate the invention and should in no way be considered to limit the scope of the invention.

Example for Iron Precipitation

A leach solution obtained from leaching of a nickel laterite ore was used. The pH of the process leach solution (PLS) was adjusted to 2.5-3.0 with nickel laterite ore and hydrogen peroxide was added to the solution which was kept at 90° C. for 1 hour while stirring. After addition of hematite seeding, iron was precipitated out of PLS mainly as hematite. After iron precipitation, acid associated with iron is released back into the PLS. As a result, pH of the PLS decreased to about 1. The iron product composition is given in the table. Ni content of the product is very low.

TABLE

| | Iron Product | |
|---|---|---|
| Parameter | XRF Analyses (%) | AAS Results (%) |
| $Fe_2O_3$ | 86 | — |
| $SiO_2$ | 1.63 | — |
| MgO | — | — |
| $Al_2O_3$ | 0.31 | — |
| NiO | 0.03 | — |
| $Na_2O$ | 0.32 | — |
| CaO | — | — |
| MnO | 0.39 | — |
| $SO_3$ | 3.33 | — |
| LOI | 7.3 | — |
| Fe | — | 55.6 |

TABLE-continued

| | Iron Product | |
|---|---|---|
| Parameter | XRF Analyses (%) | AAS Results (%) |
| Ni | — | 0.018 |
| Co | — | 0.007 |

The invention claimed is:

1. A method for recovery of iron from nickel laterite ores, comprising:
   leaching the nickel laterite ores with a mixture of sulphuric acid and urea to obtain a leach solution, and
   recovering iron, as iron oxide, from the leach solution by subjecting the leach solution to oxidation and hydrolysis at a temperature of 60-100° C.

2. The method according to the claim 1, further comprising adjusting the pH of the leach solution to 2.5-3.0 with additional nickel laterite ores before iron recovery.

3. The method according to claim 1, further comprising performing the method at atmospheric pressure.

4. The method according to claim 1, further comprising using at least one of hydrogen peroxide, air, or oxygen gas as an oxidizer for oxidation of the leach solution.

5. The method according to claim 1, further comprising using hematite seedings to initiate iron oxide formation after subjecting the leach solution to oxidation.

6. The method according to claim 1, wherein when the pH of the leach solution drops to 1.0-1.5 after iron recovery, reusing the leach solution for leaching of fresh nickel laterite ores.

7. The method according to claim 1, further comprising recovering the sulphuric acid used in leaching the nickel laterite ores substantially without loss.

8. The method according to claim 1, further comprising recovering the urea used in leaching the nickel laterite ores virtually without any loss.

\* \* \* \* \*